(12) United States Patent
Pierce (10) Patent No.: US 6,545,860 B1
(45) Date of Patent: Apr. 8, 2003

(54) AUTOMATION CONTROL ENCLOSURE HAVING A GLANDPLATE TO FACILITATE INPUT AND OUTPUT CONNECTIONS

(75) Inventor: Pip Pierce, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/672,932

(22) Filed: Sep. 28, 2000

(51) Int. Cl.⁷ ................................................ H02B 1/04
(52) U.S. Cl. ...................... 361/622; 174/17 CT; 174/59; 361/657
(58) Field of Search .................. 174/51, 17 CT, 174/52.1, 52.3, 59, 50, 52, 50.54; 361/600, 601, 622, 627, 641, 643, 657, 724–726, 728–730

(56) References Cited

U.S. PATENT DOCUMENTS

| | | | |
|---|---|---|---|
| 3,906,295 A | * 9/1975 | Tessmer | 361/643 |
| 4,289,924 A | * 9/1981 | Pearce, Jr. et al. | 174/152 G |
| 4,307,435 A | * 12/1981 | Ullman | 361/622 |
| 4,785,376 A | * 11/1988 | Dively | 361/622 |
| 5,020,149 A | * 5/1991 | Hemmie | 455/325 |
| 5,241,136 A | * 8/1993 | Michaelis et al. | 174/151 |
| 5,280,132 A | * 1/1994 | Clarey et al. | |
| 5,343,361 A | * 8/1994 | Rudy, Jr. et al. | 361/710 |
| 5,621,890 A | * 4/1997 | Notarianni et al. | 710/102 |
| 5,703,754 A | * 12/1997 | Hinze | 361/736 |
| 6,104,602 A | * 8/2000 | Morris et al. | 361/678 |
| 6,232,553 B1 | * 5/2001 | Regan | 174/64 |
| 6,242,697 B1 | * 6/2001 | Gerken et al. | 174/65 R |

\* cited by examiner

*Primary Examiner*—Gerald Tolin
(74) *Attorney, Agent, or Firm*—Robert A. Van Someren; Alexander M. Gerasimow; William R. Walbrun (57) ABSTRACT

A system to facilitate the use of an automation control disposed within an enclosure. An automation control, such as a distributed motor starter, is disposed within an enclosure. The control is coupled to modules, such as I/O modules, mounted to a glandplate. The glandplate is mounted to the enclosure over an appropriate opening. Furthermore, the glandplate is designed to accommodate a variety of module arrangements and to facilitate the connection of various data and power lines without individually wiring the lines to a separate terminal block.

8 Claims, 7 Drawing Sheets

AUTOMATION CONTROL ENCLOSURE HAVING A GLANDPLATE TO FACILITATE INPUT AND OUTPUT CONNECTIONS

FIELD OF THE INVENTION

The present invention relates generally to an automation control system, and particularly to a system that permits the enclosure of an automation control while facilitating connection of that control to various inputs, outputs, and/or power connections external to the enclosure.

BACKGROUND OF THE INVENTION

In a variety of automation environments, a control element, such as a distributed motor starter, is utilized to provide a desired control, e.g. control of a motor powering a conveyer in a factory. The automation control, such as the distributed motor starter, typically is wired for input and output signals, and is provided power by appropriate power lines. The input/output lines provide for a variety of data transfer from and to various other sensors and devices, as is known to those of ordinary skill in the art.

Often, the automation control is housed in a protective housing, such as a metal enclosure. The enclosure is custom designed for each control application. For example, the I/O may be directed through the enclosure via a conduit and connected with an internal terminal block.

For a given distributed motor starter, for instance, the enclosure is uniquely designed to receive the appropriate I/O lines and/or power lines therethrough. Typically, an electrician is required to complete the appropriate wiring.

It would be advantageous to eliminate the terminal block as well as the time-consuming and expensive wiring of the terminal block, while providing flexibility in adapting a given enclosure to a variety of applications.

SUMMARY OF THE INVENTION

The present invention features a system and method that facilitates the use of an automation control, such as a distributed motor starter. An enclosure is provided for the automation control and includes at least one enclosure wall having an opening therethrough. A plate, such as a glandplate, is attached to or disposed proximate the housing generally adjacent the opening. The plate includes an arrangement of pass-through regions, such as circular punch-outs. The pass-through regions may be selectively punched to provide openings for receiving the mounting of modules and/or power lines therethrough. For example, selected pass-through regions may be opened to receive input/output modules coupled to a distributed motor starter located within the enclosure. Any of a variety of the pass-through regions may be opened to permit various arrangements of modules, such as I/O modules. Thus, a standard enclosure can be manufactured, and the wiring of various internal automation controls can be accommodated. By way of example, various arrangements of I/O modules can be coupled to the automation control and mounted to the glandplate depending on the specific automation control within the enclosure. This not only provides greater flexibility but also allows the omission of a separate terminal block and eliminates the need for an electrician to create the various electrical connections.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
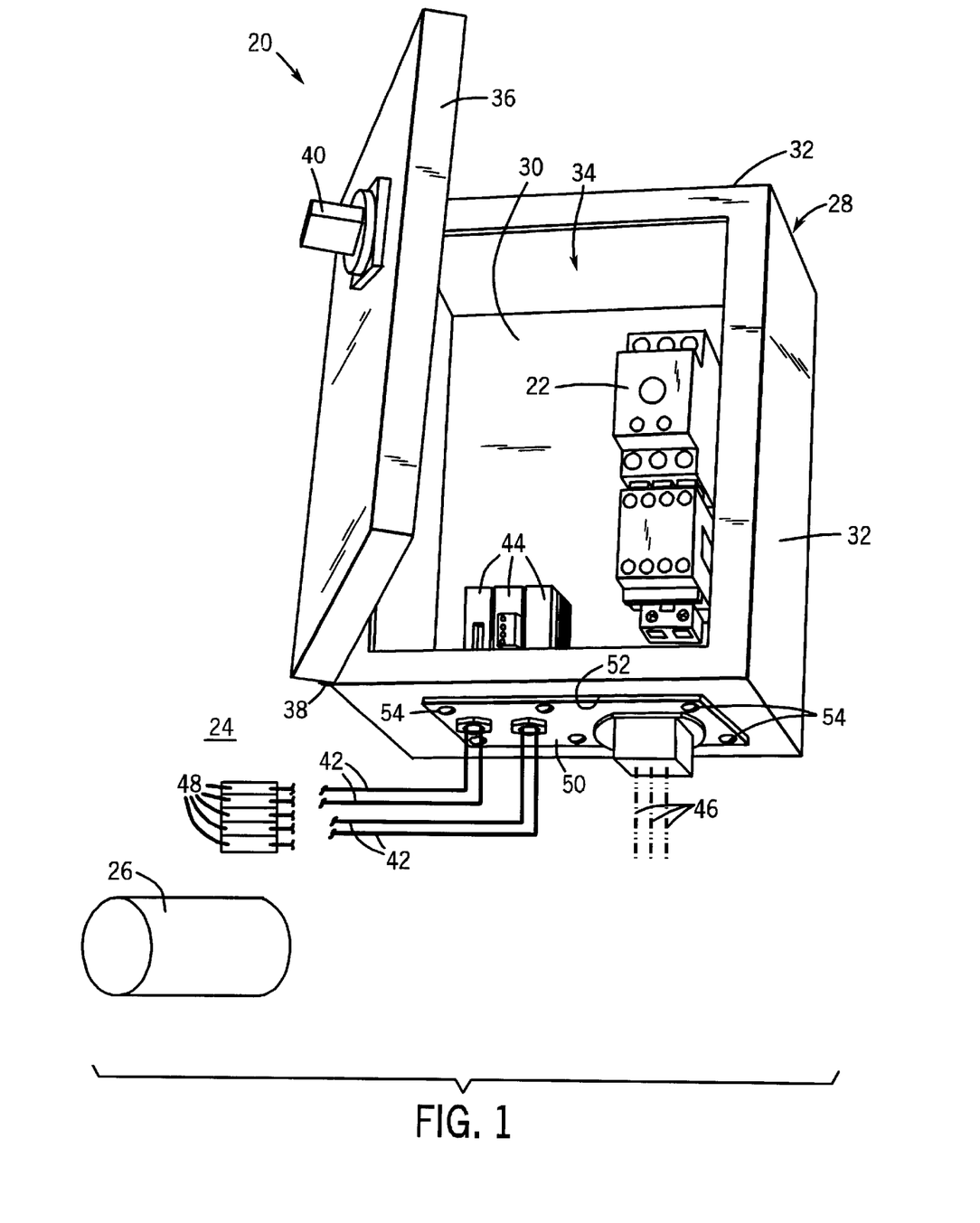
FIG. 1 is a perspective view of an exemplary control system, according to an exemplary embodiment of the present invention.

Referring generally to FIG. 1, a system 20 is illustrated, according to a one preferred embodiment of the present invention. The system is designed to facilitate the use of an automation control 22, such as a distributed motor starter, in an automation environment 24. Automation control 22 is utilized in some aspect of controlling a device 26, such as an electric motor. It should be noted that a variety of automation control devices 22 may be utilized according to the particular application, and a variety of controlled devices 26 may be connected to automation control 22, as known to those of ordinary skill in the art.

In the illustrated embodiment, automation control 22 is disposed within an enclosure 28. Enclosure 28 may have a variety of forms, but an exemplary form includes a base wall 30 and a plurality of sidewalls 32, e.g. four sidewalls, that extend from base wall 30 to form a hollow interior 34. Enclosure 28 also includes a cover 36 designed to enclose hollow interior 34. Cover 36 may be mounted to one of the sidewalls 32 by an appropriate hinge 38 to permit movement of cover 36 between an open position (as illustrated) and a closed position. When closed, access to automation control 22 is limited. A conventional latch 40 may be used to secure cover 36 in a closed position. Depending on the specific design of enclosure 28, automation control 22 may be fastened within hollow interior 34 by a variety of mechanisms, including brackets or threaded fasteners, as done in conventional enclosures.

A variety of input and output lines 42 extend through enclosure 28 and into cooperation with automation control 22. In the embodiment illustrated, input and/or output lines 42 are connected to one or more modules 44 that, in turn, are appropriately connected to automation control 22. Similarly, one or more power lines 46 extend through enclosure 28 to automation control 22.

A variety of module configurations may be utilized, depending on the specific automation environment 24 and the type of device 26 being controlled. For example, the modules 44 may be pushbutton controls, pneumatic/hydraulic modules, PLC modules, or I/O modules. In a typical application, modules 44 are I/O modules that may be connected to a variety of sensors, feedback devices, and other devices, referenced by numeral 48 in FIG. 1. In this embodiment, a variety of signals, such as electrical signals, are input and output to and from modules 44 via input/output lines 42.

As illustrated, modules 44 are mounted to a plate 50, preferably a glandplate. The glandplate is mounted to at least one of the sidewalls 32 adjacent to or over an opening 52 formed through one of the sidewalls 32. Plate 50 may be attached to the appropriate sidewall 32 by a plurality of fasteners 54, such as threaded fasteners.

Figure 2:
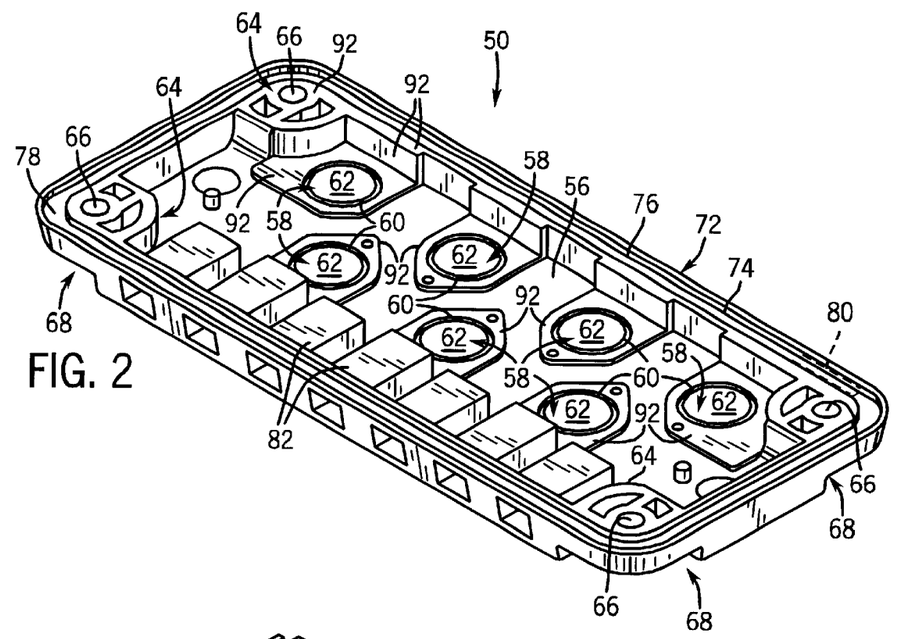
FIG. 2 is a perspective view of the interior of an exemplary mounting plate, such as a glandplate.
Figure 3:
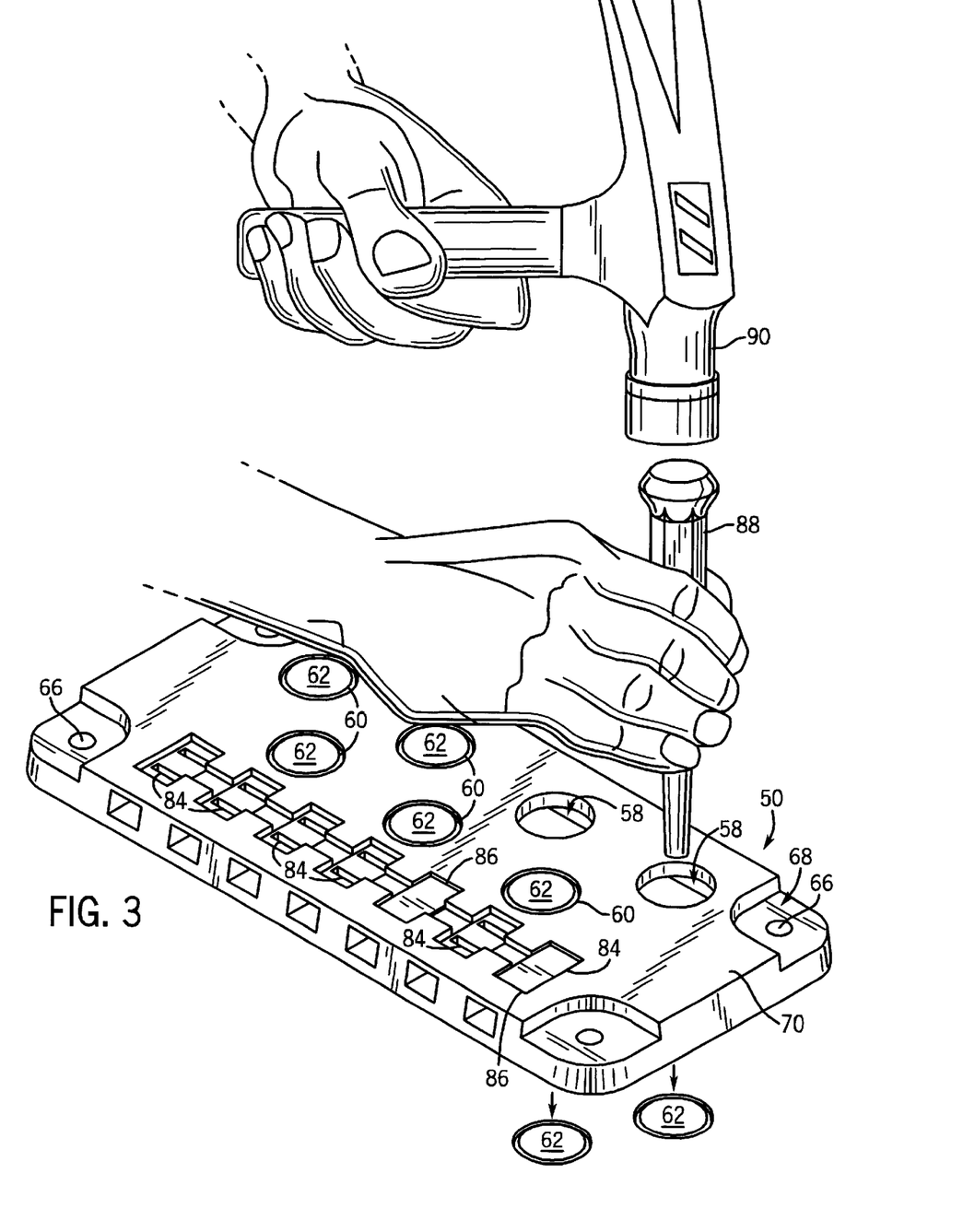
FIG. 3 is a front perspective view of the glandplate illustrated in FIG. 2.

Referring generally to FIGS. 2 and 3, an exemplary plate 50 is illustrated. In this exemplary embodiment, plate 50 is a glandplate that includes a front panel 56 having a plurality of pass-through regions 58. Each pass-through region 58 is formed by a weakened area 60 that surrounds a removable or ("punch-out") portion 62.

Plate 50 includes a plurality of reinforced regions 64 to support fasteners 54 when plate 50 is attached to enclosure 28. Each reinforced region 64 preferably includes an opening 66 therethrough to receive a corresponding fastener 54. Each opening 66 extends through its corresponding reinforced region 64 from a recessed portion 68 formed in a front surface 70 (see FIG. 3) of front panel 56. In the exemplary embodiment, plate 50 includes four reinforced regions 64, four openings 66 and four recessed portions 68. However, a variety of arrangements and configurations can be used to attach the glandplate to enclosure 28.

Plate 50 also includes a peripheral edge 72 having an outer lip 74, an inner lip 76 and a groove 78 formed therebetween. Groove 78 is designed to receive a sealing member 80, shown partially in dashed lines. Sealing member 80 typically is an elastomeric seal, such as an O-ring, that fits within groove 78. Plate 50 also may include a plurality of indicator housings 82 that correspond to pass-through regions 58. Typically, each indicator housing 82 includes an open recess 84, as best illustrated in FIG. 3. Open recesses 84 are designed to receive indicator tags 86. Indicator tags 86 may be used, for example, to mark which pass-through regions 58 have had corresponding punch-out portions 62 removed. For example, in FIG. 3, two punch-out portions 62 have been removed by tapping the punch-out portion 62 through front panel 56 via an appropriate punch 88 and hammer 90. The two open pass-through regions 58 have been appropriately marked by indicator tags 86 placed into the appropriate recesses 84.

As illustrated best in FIG. 2, plate 50 also may include a conductive material 92 positioned to form a ground between modules 44 and enclosure 28. The conductive material 92 may, for example, extend around pass-through regions 58 and along inner lip 76. Thus, when glandplate 50 is secured to enclosure 28, a ground is formed either directly between enclosure 28 and conductive material 92 or between fasteners 54 and material 92. One or more conductive fasteners 54 may be placed through one or more openings 66 in contact with both conductive material 92 and enclosure 28. Conductive layer 92 may be in the form of a deposited metallic material, a conductive wire, a foil sheet or other conductive sheet applied to the appropriate regions along the inner surface of front panel 56 and peripheral edge 72.

Figure 4:
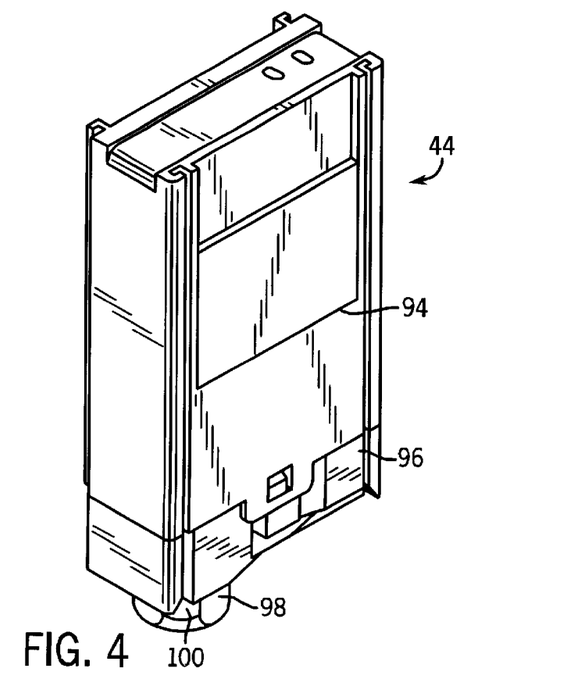
FIG. 4 is a perspective view of an exemplary I/O module.

An exemplary module 44 designed for attachment to glandplate 50 is illustrated in FIG. 4. In this embodiment, module 44 is an I/O module having a body 94 and a header 96. Additionally, a mounting member 98 is designed to extend through an open pass-through region 58, as illustrated best in FIG. 5. In this embodiment, mounting member 98 includes a threaded region 100 to which a securing nut 102 is threadably engaged upon insertion of mounting member 98 through the corresponding pass-through region 58. Thus, one or more modules 44 can be mounted to glandplate 50 by removing the appropriate punch-out portions 62 and inserting mounting members 98 through the openings. The modules are secured place by threading securing nuts 102 over corresponding threaded regions 100 on an opposite side of front panel 56 from the module bodies 94.

Figure 5:
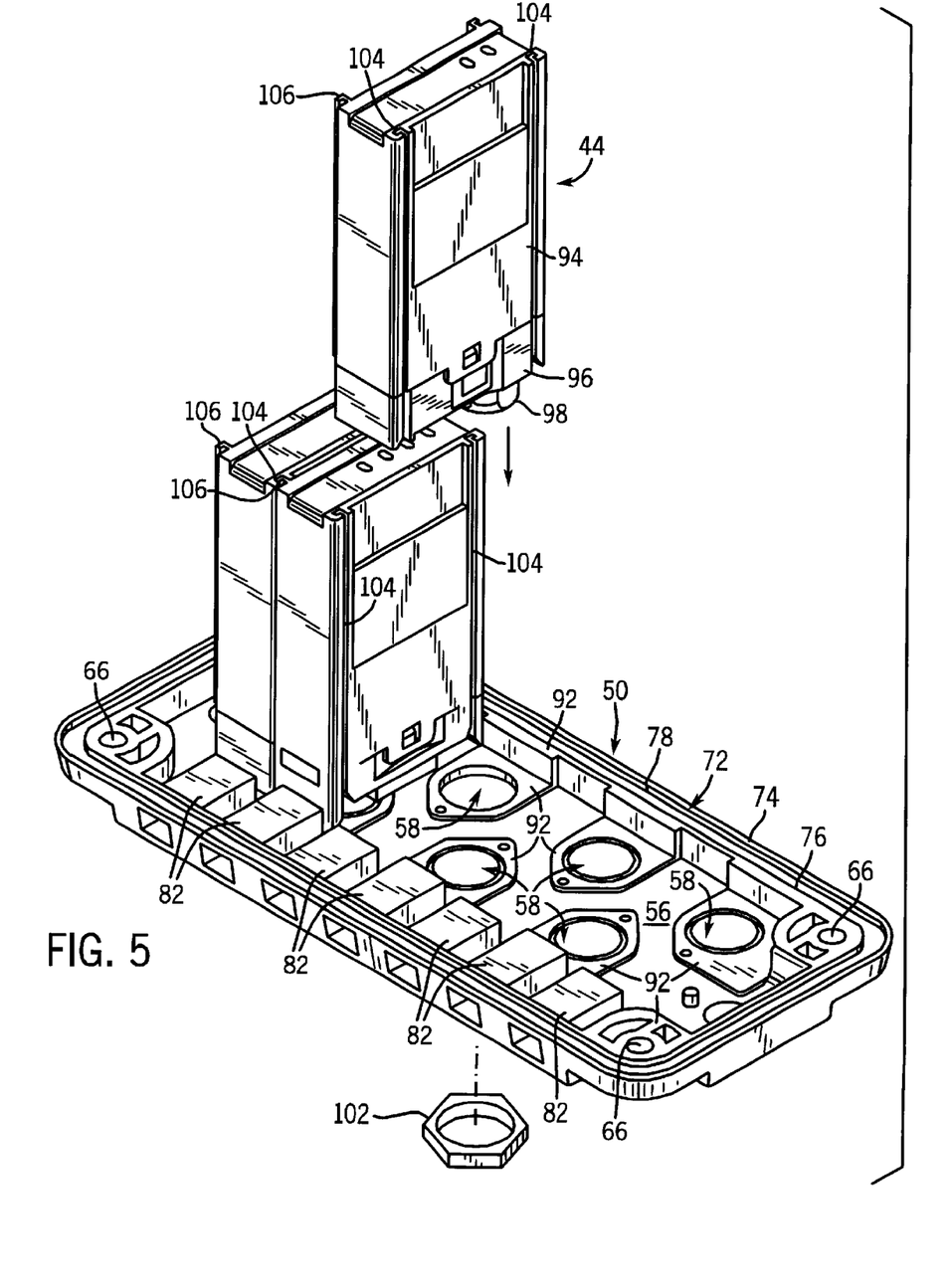
FIG. 5 is a perspective view of a plurality of I/O modules being mounted to an exemplary glandplate.
Figure 6:
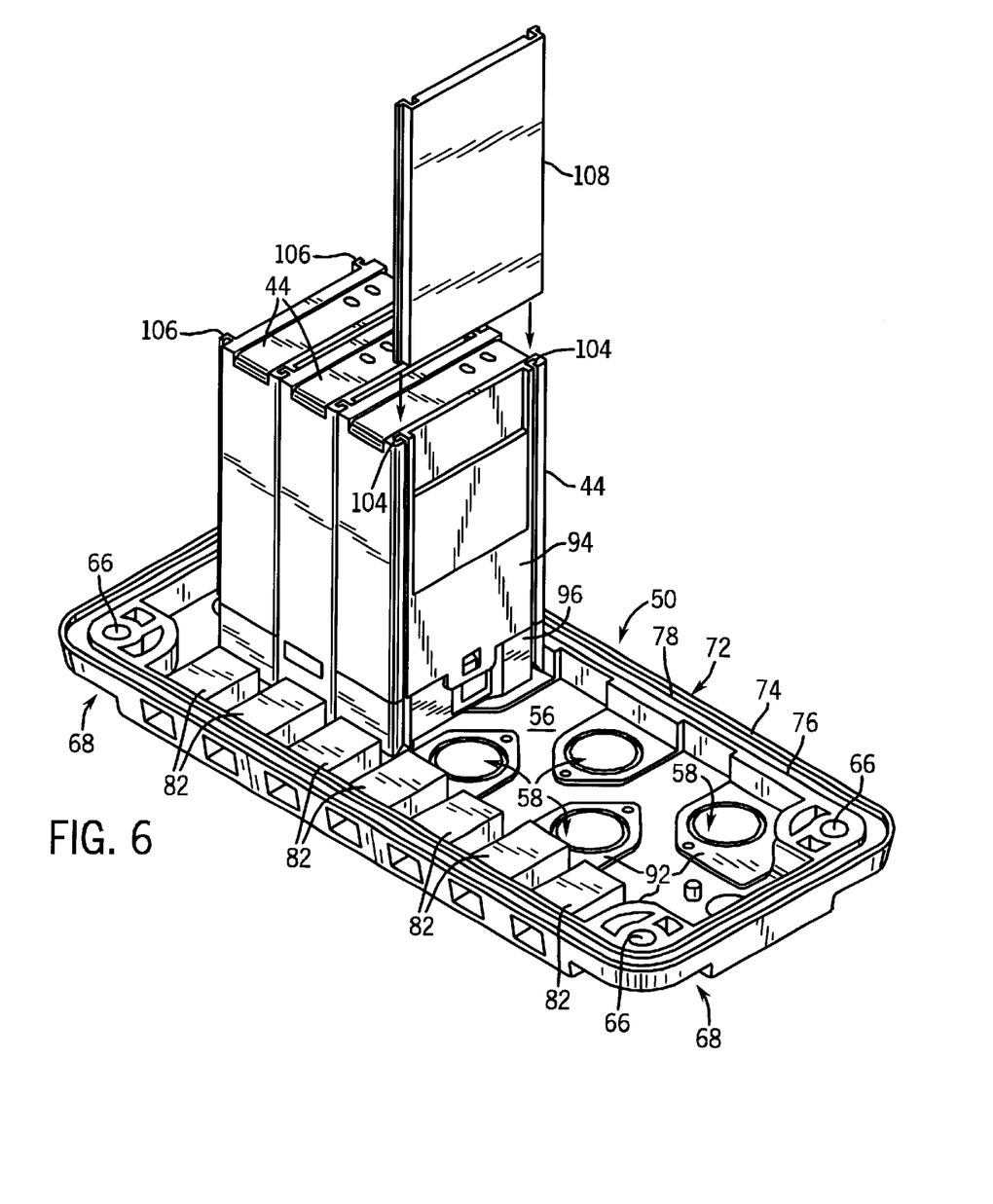
FIG. 6 is a perspective view similar to FIG. 5 showing one selected arrangement of I/O modules.

When mounting I/O modules to glandplate 50, the individual modules may be designed with corresponding attachment grooves 104 and attachment protrusions 106, as illustrated in FIGS. 5 and 6. Attachment grooves 104 and protrusions 106 are designed to slideably engage one another such that a plurality of I/O modules may be securely stacked together and attached to glandplate 50. Additionally, a termination plate 108 may be designed for engagement with the appropriate grooves 104 or protrusions 106 at the end of a desired module stack, as illustrated in FIG. 6.

Figure 7:
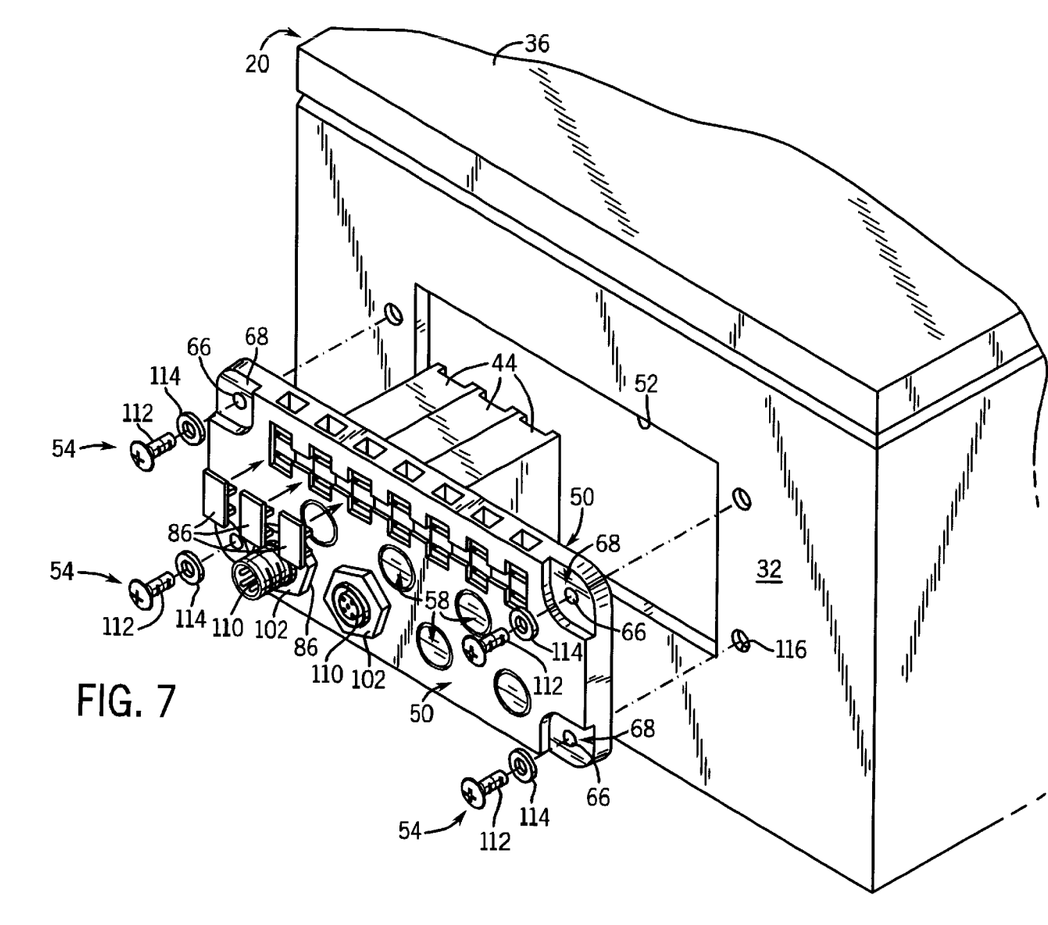
FIG. 7 is a perspective view of the combined glandplate and modules being mounted to an enclosure, according to a preferred embodiment of the present invention.

As illustrated best in FIG. 7, mounting plate 50, e.g. glandplate 50, can be customized to accommodate a variety of module arrangements, depending on the specific application. For example, if modules 44 are I/O modules, a wide selection of module types, module arrangements, and number of modules may be selected. Typically, the mounting members 98 that extend through corresponding pass-through regions 58 include appropriate connectors 110 configured for pluggable engagement with one or more input/output lines, such as input/output lines 42.

Indicator tags 86 are used to mark modules and/or pass-through regions being utilized. The combined glandplate 50 and modules 44 are fastened to any of a variety of enclosures 28 having an appropriate opening 52 for receiving modules 44 therethrough. In the illustrated embodiment, glandplate 50 is mounted adjacent or over opening 52 by fasteners 54, such as combined bolts 112 and washers 114. Bolts 112 are inserted through corresponding fastener openings 66 and received in threaded openings 116 formed in the side wall of enclosure 28 adjacent opening 52.

Figure 8:
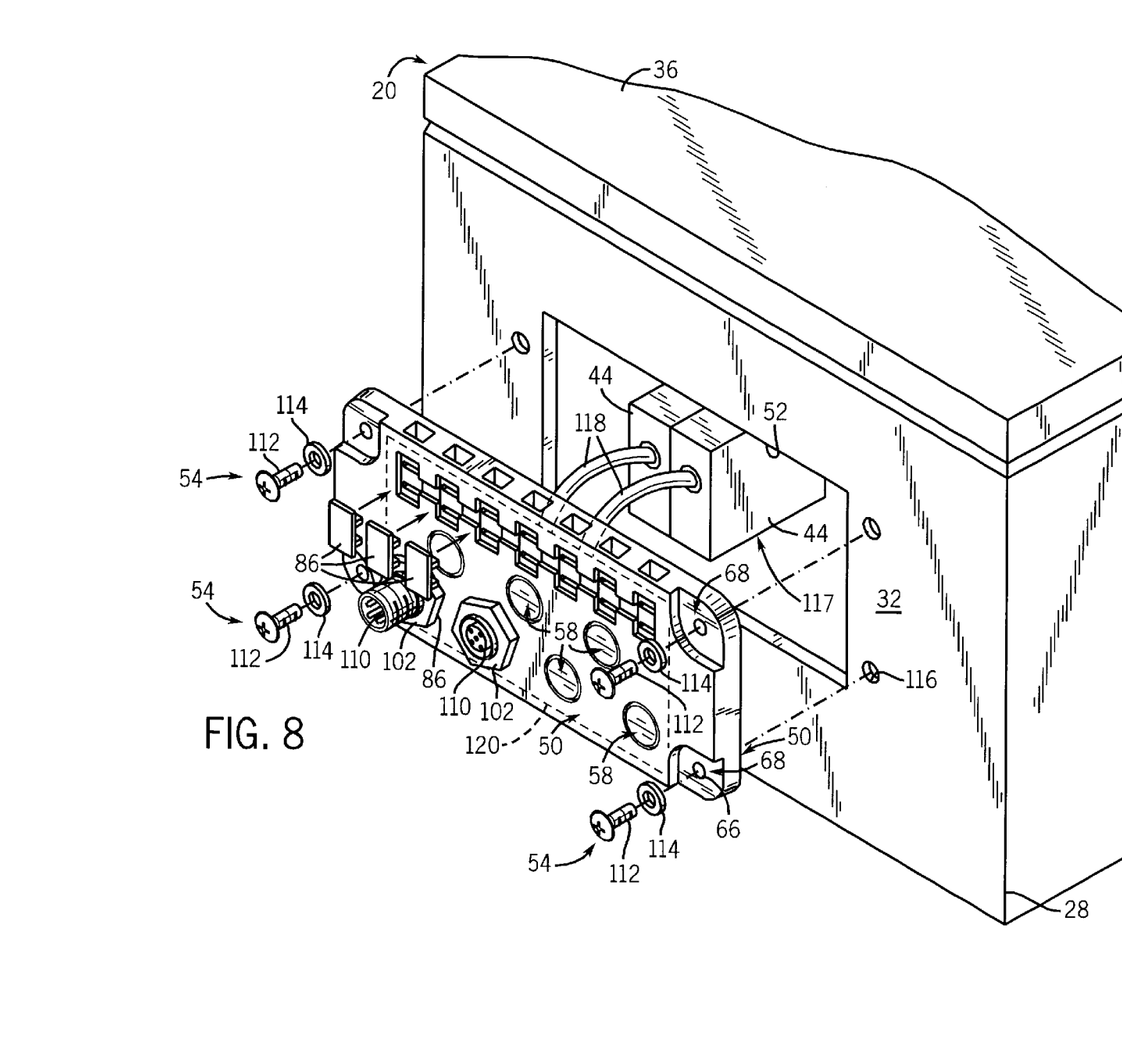
FIG. 8 illustrates an alternate embodiment of an exemplary mounting plate for use with an enclosure.

In an alternate embodiment, illustrated in FIG. 8, a module, modules or terminal block 117 is mounted inside enclosure 28. The module 117 is connected to or through appropriate pass-through regions 58 via appropriate signal communication lines 118. Lines 118 potentially are pneumatic, hydraulic, electrical or other communication line types depending on the specific design of module 117, automation control 22 and enclosure 28. In this embodiment, lines 118 are coupled to, for example, a printed circuit board 120 mounted on the inside of glandplate 50 generally parallel with front panel 56. Thus, inputs and outputs transferred through connectors 110 are communicated to printed circuit board 120 and module 117 via lines 118.

It will be understood that the foregoing description is of preferred exemplary embodiments of this invention, and that the invention is not limited to the specific forms shown. For example, a variety of glandplate shapes and sizes may be utilized in conjunction with various enclosures. The type of automation control as well as the inputs and outputs transferred through the glandplate can vary substantially depending on the specific application. For example, the controls may involve electrical or optical inputs and outputs, hydraulic inputs and outputs, pneumatic inputs and outputs, etc. Additionally, the glandplate may be designed to accommodate input/output lines and/or power lines. These and other modifications may be made in the design and arrangement of the elements without departing from the scope of the invention as expressed in the appended claims.

What is claimed is:

1. A system to facilitate the use of an automation control, comprising:
    an automation control enclosure having a hollow interior defined at least in part by an enclosure wall, wherein the enclosure wall has an opening therethrough;
    an automation control, of the type including motor starters and motor controllers, disposed in the automation control enclosure;
    a plate mounted adjacent the opening, the plate having a plurality of pass-through regions which are selectively opened, each pass-through region being formed by a weakened area disposed about a removable portion; and
    an I/O module having a connector, wherein a selected pass-through region receives the connector therethrough.

2. The system as recited in claim 1, wherein the automation control is electrically coupled to the I/O module.

3. The system as recited in claim 2, further comprising a power line to supply electrical power to the automation control, wherein the plate includes an opening receiving the power line therethrough.

4. The system as recited in claim 1, wherein each weakened area is a circular area.

5. The system as recited in claim 1, wherein the plate includes a ground member disposed for grounding contact between the I/O module and the enclosure.

6. The system as recited in claim 1, further comprises a plurality of I/O modules having connectors disposed through a plurality of pass-through regions.

7. The system as recited in claim 6, further comprising a plurality of marker tags connected to the plate proximate the plurality of I/O modules.

8. The system as recited in claim 1, wherein the plate is sealed to the enclosure.

* * * * *